INVENTOR.
CHARLES F. SECK
BY Clarence R. Patty, Jr.
ATTORNEY

Feb. 6, 1962 C. F. SECK 3,020,193
CAPACITOR MANUFACTURE
Filed Nov. 1, 1956 4 Sheets-Sheet 2

INVENTOR.
CHARLES F. SECK
BY Clarence R. Patty J.
ATTORNEY

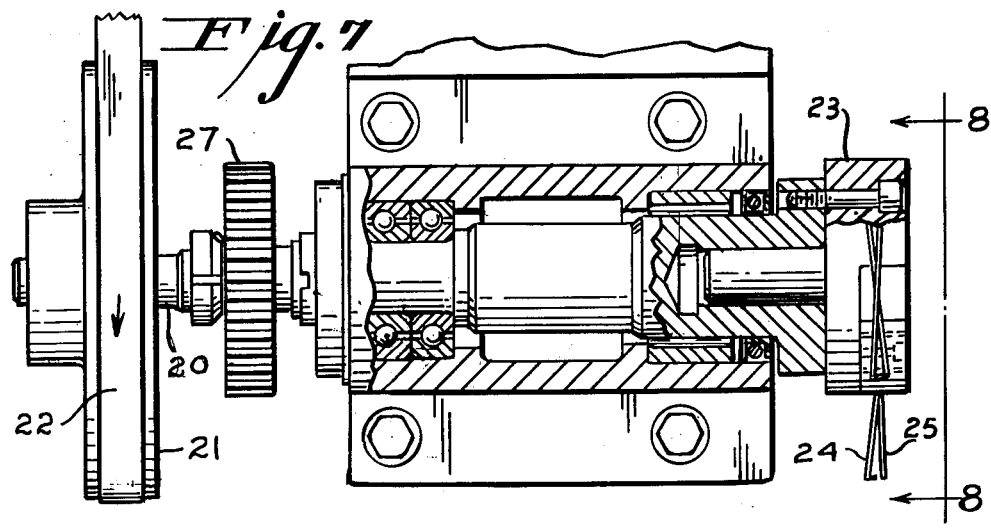
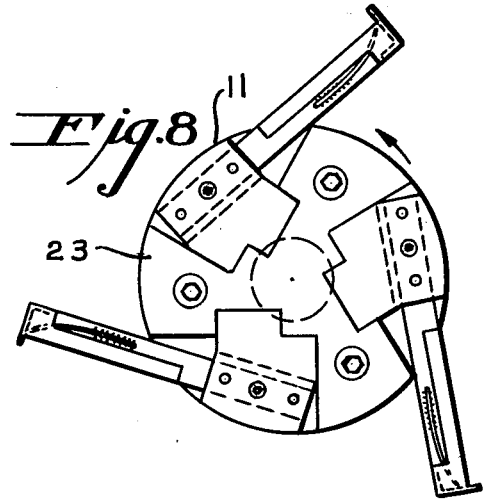
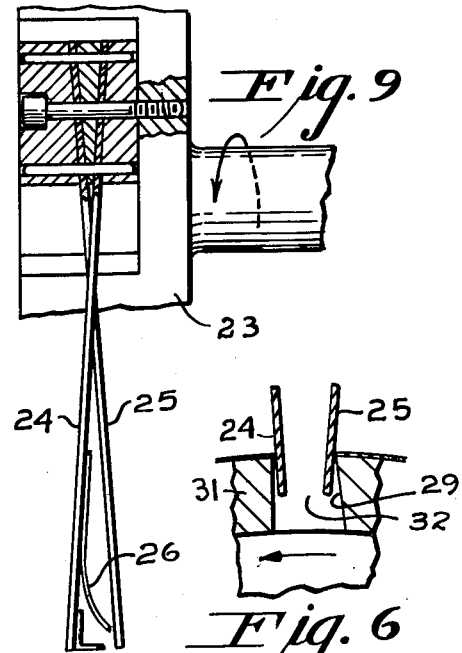
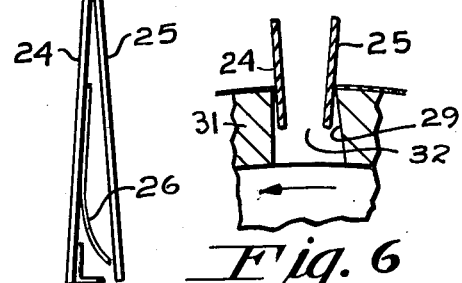
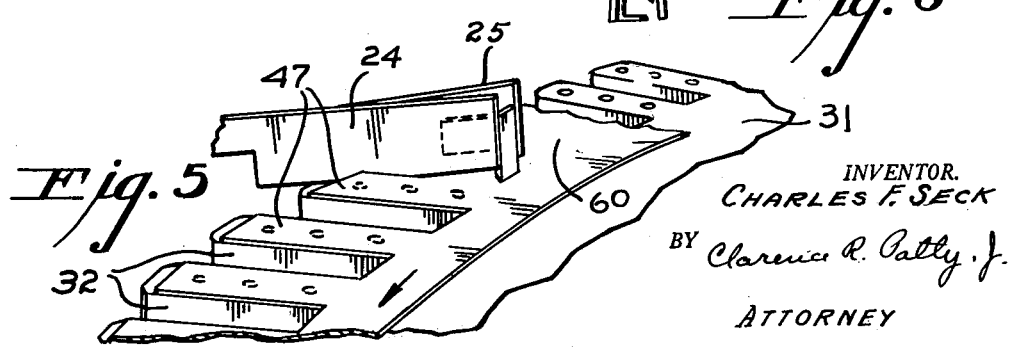
INVENTOR.
CHARLES F. SECK
BY Clarence R. Patty Jr.
ATTORNEY Feb. 6, 1962 — C. F. SECK — 3,020,193
CAPACITOR MANUFACTURE
Filed Nov. 1, 1956 — 4 Sheets-Sheet 4
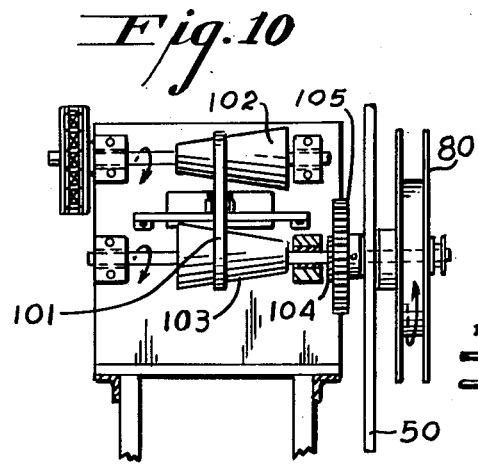
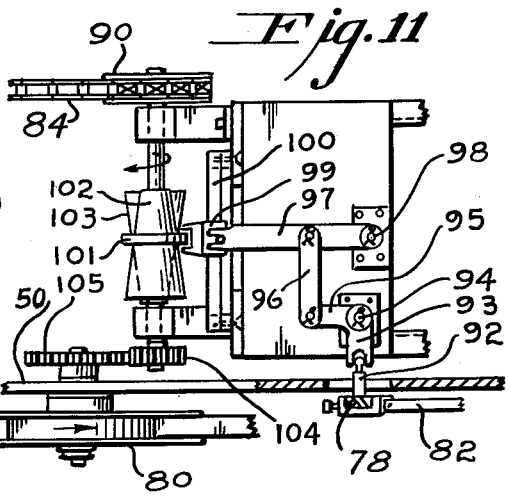
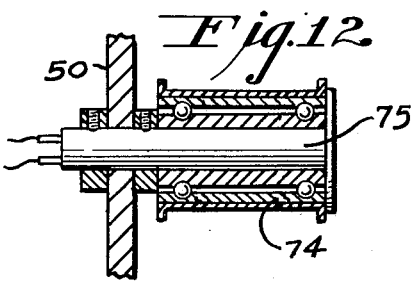
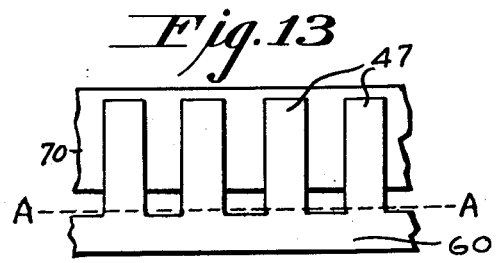
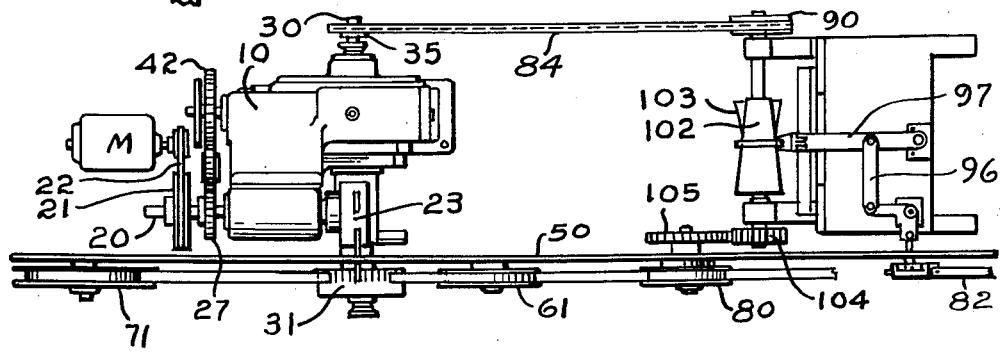
INVENTOR.
CHARLES F. SECK
BY Clarence R. Patty, Jr.
ATTORNEY

3,020,193
CAPACITOR MANUFACTURE
Charles F. Seck, Corning, N.Y., assignor to Corning Glass Works, Corning, N.Y., a corporation of New York
Filed Nov. 1, 1956, Ser. No. 619,893
3 Claims. (Cl. 156—517)

The present invention relates to the shearing of sheets from a ribbon of material and for applying such sheets to a ribbon of material in predetermined relation with respect to one another. The invention is particularly useful in the manufacture of fixed capacitors composed of alternate layers of thin glass ribbon and sheets of aluminum foil.

One method of manufacture of such a form of capacitor involves separating a glass ribbon into workable lengths, and adhesively applying sheets of metal foil in proper laterally spaced relation along the length of each strip of ribbon of a pile of such strips as they are being stacked. Such a method of capacitor manufacture is fully described in Smith Patent No. 2,526,703.

According to the invention the problem of formation of sheets of foil and of their application to a glass ribbon is simplified by the provision of a sheet cutter adapted to cut sheets of aluminum or the like from a roll thereof by use of a drum type die over the cylindrical surface of which the foil ribbon is fed and sheets of foil cut therefrom, such sheets being retained on the die surface until picked up by a ribbon of glass trained over the drum surface and having an adhesive coating for engagement and seizure of such sheets. Conveniently, transfer of such sheets from the drum to the ribbon of glass is effected as the ribbon is fed from a continuous supply source or is being unwound from one spool onto another. In the foregoing fashion entire spools of glass ribbon having sheets of aluminum foil properly spaced thereon may be made available for ready separation into strips supporting any desired number of sheets of foil for assembly, either by hand as taught by the aforesaid patent, or by suitable stacking equipment.

A preferred form of the invention is diagrammatically illustrated in front elevation in FIG. 1 of the accompany drawings.

FIG. 5 is a greatly enlarged perspective view of a fragment of the drum and of shear blades of the cutter head assembly respectively, showing a length of notched ribbon arranged on the drum.

FIG. 6 is an enlarged view, in section, of a fragment of the drum die, of one pair of the shear blades of the cutter head assembly, and a piece of ribbon being sheared or notched.

FIG. 7 is a front elevation view, partly in section, of the cutter head and its drive assembly.

FIG. 8 is a view taken on line 8—8 of FIG. 7.

FIG. 9 is an enlarged view, partly in section, of a fragment of the cutter head and of one pair of its shear blades.

FIG. 10 is a side elevation, partly in section, of a variable speed spool drive unit for an associated spool upon which glass ribbon that has been provided with sheets of foil is wound.

FIG. 11 is a top plan view, partly in section, primarily of the apparatus shown in FIG. 10.

FIG. 12 is a sectional view, showing an electrically heated pulley over which the glass ribbon passes.

FIG. 13 is a plan view, on an enlarged scale, of a length of glass ribbon overlaid with sheets of foil still attached to a parent foil ribbon.

FIG. 14 is a diagrammatic plan view of the invention as depicted in front elevation by FIG. 1.

Figure 2:
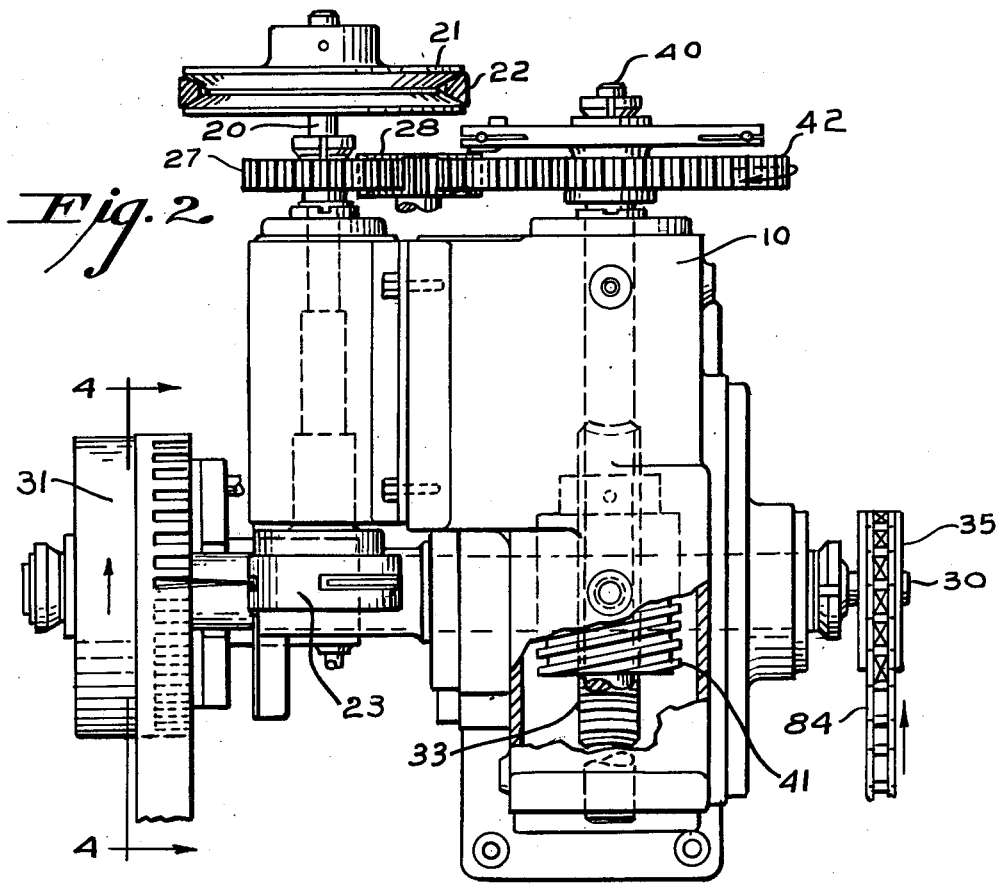
FIG. 2 is a top plan view of a sheet cutter assembly, embodying the invention, showing a ribbon of foil associated therewith, being notched by such cutter.
Figure 4:
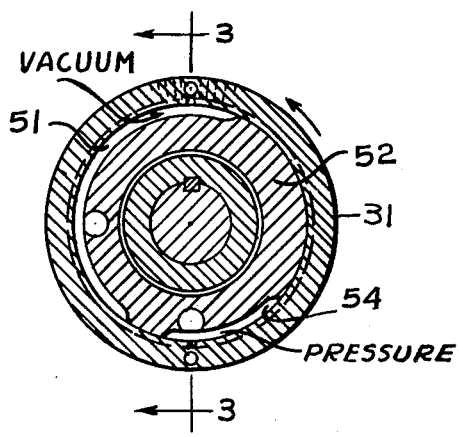
FIG. 4 is a view of the drum die taken generally along line 4—4 of FIG. 2.
Figure 3:
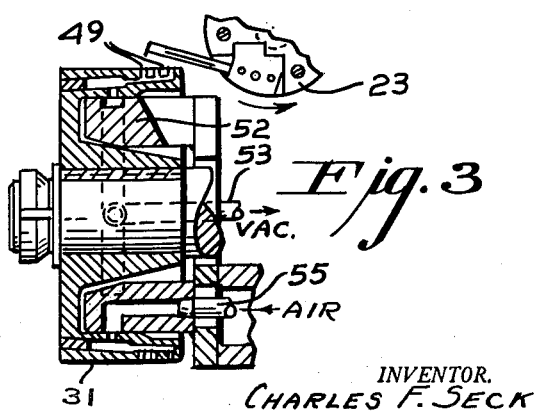
FIG. 3 is a sectional view of the drum die of such assembly taken on line 3—3 of FIG. 4, showing a side elevational view of a fragment of the cutter head thereof.

Referring now particularly to FIGS. 2, 3 and 4, the sheet cutter assembly is embodied in a housing 10 having shafts 20 and 30 passing therethrough and mounted in suitable bearings therein.

The shaft 20 at one end carries a pulley 21 adapted to be driven by a belt 22 from a suitable power source, such as the motor M, FIG. 14. At its other end, shaft 20 carries a cutter head 23 provided with three sets of shearing blades spaced 120° apart and each having two blades, such as 24 and 25 (FIGS. 5–9); such shearing blade sets being adapted to successively enter slots, such as 32, in a sheet cutter die or drum 31 carried on one end of shaft 30.

Within the housing 10, shaft 30 carries a worm wheel 33 for driving such shaft. Arranged in mesh with worm wheel 33 is a worm 41 arranged on a shaft 40 having one end projecting from housing 10 and provided with a gear 42 adapted to be driven by shaft 20 through the medium of a gear 27 carried by such shaft and a suitably supported intermediate gear 28. As will be understood the ratio of the gears between shafts 20 and 30 is such that the cutter head 23 rotates one third revolution during the turning of drum 31 through an arc of the number of degrees between the respective centers of its slots 32 (FIGS. 5 and 9), and the synchronization is such that a different pair of shear blades, such as blades 24 and 25 will start, entering a slot such as 32 and slideably engage the laterally bordering walls thereof, such as 29, in shearing relation during each one-third revolution of shaft 30. As will be understood, the shear blades have sufficient resiliency to flex laterally as they pass through a slot 32 of the rotating drum 31. Moreover, as clearly illustrated in FIGS. 6 and 9, excessive pressure between a blade such as 25 and a drum slot wall 29 as the drum is rotating in the direction indicated is prevented by crossing it with blade 24 and back tapering such wall from vertical, as indicated. Associated with each shear blade such as 24 in a wire member 26 cooperative with the associated blade 25 after the blades clear a drum slot to dampen the vibrations of such blades after they become disassociated from the drum.

Figure 1:
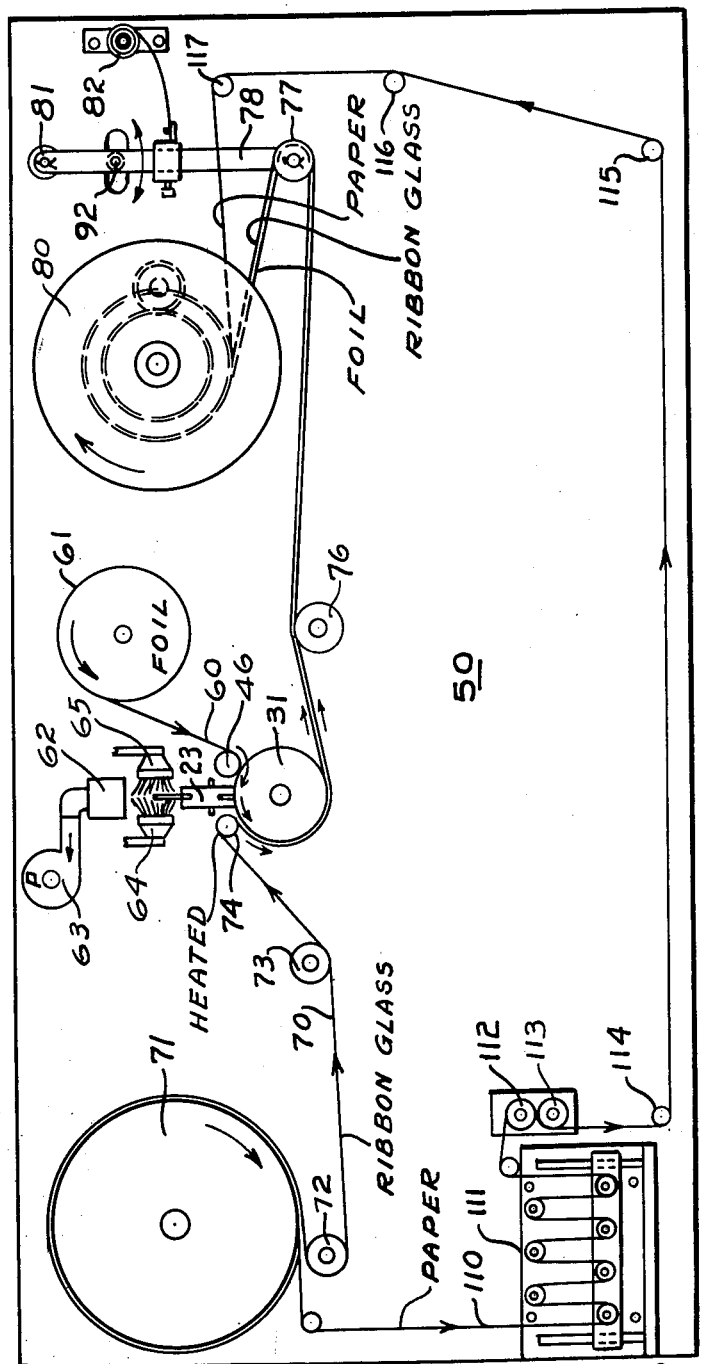

To utilize the foregoing cutting apparatus, as illustrated in FIG. 1, the drum 31, which conveniently is located in front of a suitable panel 50, has a ribbon of metal foil 60 issuing from a spool 61 thereof fed thereover, under a suitable traction roller 46. As will be noted from an examination of FIGS. 5 and 13, such foil is notched to form uniformly spaced sheets such as 47. Under these circumstances the remainder of the ribbon 60 connecting such sheets projects beyond the edge of the glass ribbon and may be subsequently sheared off, along line A—A (FIG. 13) for example, by conventional shearing rolls. As will be evident however if a ribbon of foil is used of a width narrower than the length of slots 32, isolated sheets similar to 47 will be produced, making such an auxiliary shearing operation unnecessary. Spaced foil sheets, such as 47, whether attached to the parent ribbon or not, are retained on the drum 31 through substantially one-half revolution of its travel by means of negative pressure applied to the under surfaces of such sheets via passages 49 (FIG. 3) in communication with a vacuum chamber 51 (FIG. 4) provided by a fixed shoe 52 projected into the drum cavity from the housing 10 and connected to a suitable vacuum line 53. To positively expel sheets such as 47 from the drum surface when desired, shoe 52 is also cooperative with the drum 31 to provide a pressure chamber 54 to which a compressed air line 55 is connected.

From a cursory examination of FIG. 5 it can be seen that the formation of metal foil sheets in any instance is effected by removal from the metal foil ribbon 60 of the segments of foil that bridge the respective drum slots 32. As diagrammatically illustrated in FIG. 1, to properly disposed of such segments a suitable duct 62 provided with a suction fan or pump 63 and an appropriately screened segment receiving container (not shown), has its entrance arranged in close association with the shear blades, such as 24 and 25. Also, to assist in the dislodgement of metal foil segments or fragments thereof from the blades, brushes 64 and 65 are arranged along their path. Brushes 64 and 65 are also utilized to apply a lubricant to the blades as they pass therebetween.

As illustrated in FIG. 1, a glass ribbon 70, issuing from a spool 71, is trained about suitable idler pulleys 72 and 73 and via an electrically heated pulley 74 (electrically heated by a suitable heating element 75—FIG. 12) and about a surface region of drum 31 already occupied by metal foil sheets, such as 47, and passing over the vacuum chamber 51. A suitable adhesive previously applied to the surface of ribbon 70 that engages sheets 47 is heated to a tacky condition as it passes over pulley 74 so that such sheets 47 become adhesively attached to the ribbon 70 as it passes over the surface of drum 31 occupied by such sheets.

The ribbon 70 after being provided with metal foil sheets is trained over idler pulleys 76 and 77 before being wound on a spool 80. Pulley 77 is carried by a winding speed regulating arm 78 pivoted at 81, and intermediate its ends attached to one end of a constant tension coil spring 82.

The rotation of spool 80 to wind the glass ribbon thereon as it becomes disassociated from drum 31 is effected by a drive chain 84 (FIGS. 2, 11, and 14) trained about a sprocket wheel 35 on the end of drum shaft 30 and about a sprocket wheel 90 of a variable speed spool drive assembly best illustrated in FIGS. 10 and 11.

As illustrated in FIGS. 1, 10 and 11 the speed regulating arm 78, at a point intermediate its ends, is attached to one end of an actuating pin 92. The opposite end of pin 92 is adapted to pivot in an arm 93 of a bell crank pivoted at 94 and whose arm 95 is attached through a link 96 to an arm 97 having one end pivoted at 98. The other end of arm 97 is cooperative with a forked member 99 slideable along a bar 100 as the bell crank turns about its pivot 94, to shift the position of a belt 101 trained about a cone pulley 102 driven by sprocket wheel 90 and a cone pulley 103 which, through the medium of gears 104 and 105 is adapted to rotate the spool 80 to wind the foil equipped glass ribbon thereon. As will be appreciated, as the diameter of the coil of ribbon wound on spool 80 increases its rate of turning movement must be reduced. This is accomplished by the foregoing arrangement, since as the tension of the ribbon about pulley 80 tends to increase, spring 82 permits the arm 78 to move leftward, with reference to FIG. 1, to, through the medium of the pin 92, and the described linkages shift the belt 101 in a direction to reduce the rotational speed of pulley 80 to maintain the tension of the ribbon within a satisfactory range.

To protect the opposite surfaces of the glass ribbon 70, both before and after having been provided with metal foil sheets, a ribbon 110 (FIG. 1) of paper is coiled between its respective glass ribbon layers on spool 71. The ribbon 110 is transferred from spool 71 to spool 80 via a slack take up assembly 111 and suitable pulleys 112 through 117 respectively in an obvious manner.

What is claimed is:

1. In a machine suitable for cutting sheets of metal foil from a ribbon thereof and for attaching such sheets in predetermined spaced relation to a ribbon of dielectric material, a rotatable drum, means for feeding metal foil in ribbon form onto the cylindrical surface of said drum, means for supplying negative pressure through such surface of the drum to hold the foil in engagement therewith, means for separating the so-held foil into sheets during its passage over the surface of said drum, means for training a dielectric ribbon over the surface of such drum occupied by a foil sheet, means for applying heat to the dielectric ribbon to activate an adhesive applied to the under surface thereof to effect adherence of an engaged sheet thereto, and means for progressively winding the ribbon into a coil following its departure from said drum.

2. A machine by means of which sheets of metal foil may be attached to a ribbon of dielectric material in predetermined spaced relation along the length thereof, which includes supply sources from which ribbons of dielectric and metal foil respectively may be obtained, a spool onto which a ribbon of dielectric material having sheets of metal foil attached thereto may be wound, a rotatable drum, means for feeding the foil ribbon from its source over a cylindrical surface of the drum, means for forming sheets from said ribbon while occupying such drum surface, means for training the dielectric ribbon from its source about a cylindrical surface of the drum occupied by the sheets of foil, means for activating an adhesive previously applied to the metal foil engaging surface of the dielectric ribbon to effect adherence of the engaged sheets with such ribbon, and means for winding such dielectric ribbon upon such spool following its departure from such drum surface.

3. In a sheet material shearing device a rotatable hollow drum whose cylindrical wall is perforated, means within the drum cavity for connecting one arcuate portion of the cavity with a negative pressure source when in one radial portion, means for connecting such portion of the drum to a positive pressure source when in another radial position whereby an article may be held to the drum surface as it travels about a portion of its path and may be expelled from such surface as it travels about another portion of its path, means for feeding a length of foil of a ribbon thereof over a cylindrical surface of said drum as such surface travels along the arc of its rotary path under the influence of negative pressure, means for shearing sheets from such foil while arranged on such surface and while traveling through such arc, means for training a ribbon of dielectric material over the surface region of said drum occupied by such sheets of foil, means for activating an adhesive previously applied to the under side of said dielectric ribbon as it is trained over the drum to effect adherence of a sheet of foil thereto before the sheets are advanced along the arc of the drum path in which positive pressure is applied thereto to expel them from such drum surface.

References Cited in the file of this patent

UNITED STATES PATENTS

| | | |
|---|---|---|
| 2,318,056 | Christman | May 4, 1943 |
| 2,341,956 | Staude | Feb. 15, 1944 |
| 2,372,617 | Trew | Mar. 27, 1945 |
| 2,492,166 | Marco | Dec. 27, 1949 |
| 2,497,212 | Donofrio | Feb. 14, 1950 |
| 2,568,463 | Reynolds | Sept. 18, 1951 |
| 2,593,286 | Fermanian | Apr. 15, 1952 |
| 2,600,322 | Raney | June 10, 1952 |
| 2,618,311 | Parker | Nov. 18, 1952 |
| 2,688,582 | Phair | Sept. 7, 1954 |
| 2,694,447 | Hull | Nov. 16, 1954 |
| 2,737,859 | Allison | Mar. 13, 1956 |
| 2,753,619 | Franklin | July 10, 1956 |
| 2,778,762 | Eisler | Jan. 22, 1957 |
| 2,792,887 | Middelhof | May 21, 1957 |